US009812006B1

(12) United States Patent
Mi

(10) Patent No.: US 9,812,006 B1
(45) Date of Patent: Nov. 7, 2017

(54) SYSTEM AND METHOD FOR INTEGRATING INFRARED REMOTE CONTROLS OF HOME APPLIANCES

(71) Applicant: NXCONTROL SYSTEM CO., LTD., Zhubei, Hsinchu County (TW)

(72) Inventor: Tsung-Hsiang Mi, Zhubei (TW)

(73) Assignee: NXCONTROL SYSTEM CO., LTD., Zhubei, Hsinchu (TW)

( * ) Notice: Subject to any disclaimer, the term of this patent is extended or adjusted under 35 U.S.C. 154(b) by 8 days.

(21) Appl. No.: 15/148,307

(22) Filed: May 6, 2016

(51) Int. Cl.
*H04B 10/00* (2013.01)
*G08C 23/04* (2006.01)
*G08C 17/02* (2006.01)

(52) U.S. Cl.
CPC ............. *G08C 23/04* (2013.01); *G08C 17/02* (2013.01); *G08C 2201/30* (2013.01); *G08C 2201/70* (2013.01)

(58) Field of Classification Search
CPC .... G08C 23/04; G08C 17/02; G08C 2201/30; G08C 2201/70
USPC .......................................................... 398/106
See application file for complete search history.

(56) References Cited

U.S. PATENT DOCUMENTS

2012/0173979 A1* 7/2012 Lee ........................ G06F 9/4445 715/719
2013/0171981 A1* 7/2013 Woo ........................ G08C 17/02 455/420
2014/0121786 A1* 5/2014 Chen ...................... G05B 15/02 700/19
2014/0176309 A1* 6/2014 Wang ............... H04N 21/42226 340/12.5

* cited by examiner

*Primary Examiner* — Juan A Torres
(74) *Attorney, Agent, or Firm* — patenttm.us

(57) ABSTRACT

A system for integrating infrared remote controls of home appliances includes a smart electronic device, a transmission device and multiple conversion devices. The smart electronic device is collaborated with the transmission device to transmit a wireless control signal. The multiple conversion devices are respectively mounted on multiple home appliances. After receiving the wireless control signal, a selected conversion device converts the wireless control signal into an infrared remote control code that is further transmitted to a corresponding home appliance for remote control. Because of transmission using radio signals between the transmission device and the multiple conversion devices, there is no concern for communication failure arising from obstruction, limited distance and high directivity demanding to be within a receiving angle upon remote control. As only one remote control is used, operational convenience increases. Additionally, some home appliances can be jointly controlled according to a configured situation.

26 Claims, 14 Drawing Sheets

SYSTEM AND METHOD FOR INTEGRATING INFRARED REMOTE CONTROLS OF HOME APPLIANCES

BACKGROUND OF THE INVENTION

1. Field of the Invention

The present invention relates to a system and a method for integrating infrared remote controls of home appliances and, more particularly, to a system and a method using a smart electronic device to remotely control multiple home appliances with infrared control.

2. Description of the Related Art

Currently, home appliances usually have a corresponding remote control, such as remote controls for a TV (Television), a set-top box, a DVD (Digital Video Disc) player, a stereo system and the like. To easily control any home appliance, a corresponding remote control for the home appliance must be located first. More and more different types of home appliances are added to the household environment of everyone because of continuous technological advancement. It ends up with a plentiful of remote controls at home and consumes more time in search of a remote control to be located before a corresponding home appliance can be controlled.

Besides, most current remote controls adopt infrared radiation for transmission of control signals. However, obstruction occurring between a remote control and a corresponding home appliance causes failure of transmission for control signals between the remote control and the corresponding home appliance. Meanwhile, as each infrared receiver has its unique acceptance angle and distance range, infrared control signals beyond the acceptance angle or the distance range fail to be received by a corresponding home appliance. Under the circumstance, the corresponding home appliance fails to be remotely controlled by the remote control.

SUMMARY OF THE INVENTION

An objective of the present invention is to provide a system and a method for integrating infrared remote controls of home appliances to ensure increased convenience and less communication failure for remote control.

To achieve the foregoing objective, the system for integrating infrared remote controls of home appliances includes a smart electronic device, a transmission device and multiple conversion devices.

The smart electronic device has an operating system to perform an application program. The application program displays a user interface and stores multiple infrared remote control codes for respectively controlling multiple home appliances. Each infrared remote control code corresponds to a control command inputted from the user interface and the smart electronic device outputs a corresponding infrared remote control code.

The transmission device is connected to the smart electronic device and has an infrared receiver, a first microprocessor and a first wireless transmission module.

The infrared receiver is connected to the first microprocessor and receives the corresponding infrared remote control code.

The first microprocessor serves to convert the corresponding infrared remote control code into a wireless control signal.

The first wireless transmission module is connected to the first microprocessor and transmits the wireless control signal.

The multiple conversion devices are mounted on the respective home appliances. Each conversion device has a second wireless transmission module, a second microprocessor and an infrared transmitter.

The second wireless transmission module is wirelessly connected to the first wireless transmission module and receives the wireless control signal.

The second microprocessor is connected to the second wireless transmission module and converts the wireless control signal into the corresponding infrared remote control code.

The infrared transmitter is connected to the second microprocessor and transmits the corresponding infrared remote control code to a corresponding home appliance.

Based on the foregoing system, the smart electronic device performs the application program to display the user interface with one of the multiple conversion device displayed thereon selected. The first wireless transmission and the second wireless transmission module are wirelessly connected. The control command is inputted through the user interface. The smart electronic device transmits a corresponding infrared remote control code to the transmission device according to the control command. The first microprocessor further converts the corresponding infrared remote control code into a wireless control signal. The first wireless transmission module transmits the wireless control signal to the second wireless transmission module. After the second wireless transmission module receives the wireless control signal, the second microprocessor converts the wireless control signal into the corresponding infrared remote control code. The infrared transmitter transmits the corresponding infrared control code to the infrared receiver of a corresponding home appliance for remote control over the corresponding home appliance.

To achieve the foregoing objective, the method for integrating infrared remote controls of home appliances is performed by a system for integrating infrared remote controls of home appliances having a smart electronic device, a transmission device and multiple conversion devices. The method includes steps of:

connecting the transmission device with the smart electronic device for the smart electronic device to perform an application program, wherein the application program is launched to provide a user interface;

selecting one of the multiple conversion devices to be connected through the user interface, wherein the selected conversion device transmits an infrared remote control code to a corresponding home appliance;

establishing connection between the smart electronic device and the conversion device;

transmitting a wireless control signal to the selected conversion device through the smart electronic device in collaboration with the transmission device; and converting the wireless control signal into the infrared remote control code and transmitting the infrared remote control code to the corresponding home appliance for control over the corresponding home appliance.

From the foregoing description, the method utilizes the smart electronic device to perform the application, selects one of the multiple conversion devices to be connected through the user interface to establish connection, inputs the control command and a corresponding infrared remote control code through the user interface to generate the wireless control signal in the form of a radio signal, transmits the wireless control signal to the selected conversion device for the selected conversion device to convert the wireless control signal into the corresponding infrared remote control code, and transmits the corresponding infrared remote control code to a corresponding home appliance to complete the remote control. Given the transmission using radio signals between the transmission device and the multiple conversion devices, there is no concern for communication failure arising from obstruction, limited distance and high directivity demanding to be within a receiving angle upon remote control. As the smart electronic device is collaborated with the transmission device to act as an integrated remote control for the multiple home appliances, operational convenience increases with simplified equipment requirement, such that users do not have to fumble around in search of all the infrared remote controls.

Other objectives, advantages and novel features of the invention will become more apparent from the following detailed description when taken in conjunction with the accompanying drawings.

DETAILED DESCRIPTION OF THE INVENTION

Figure 1:
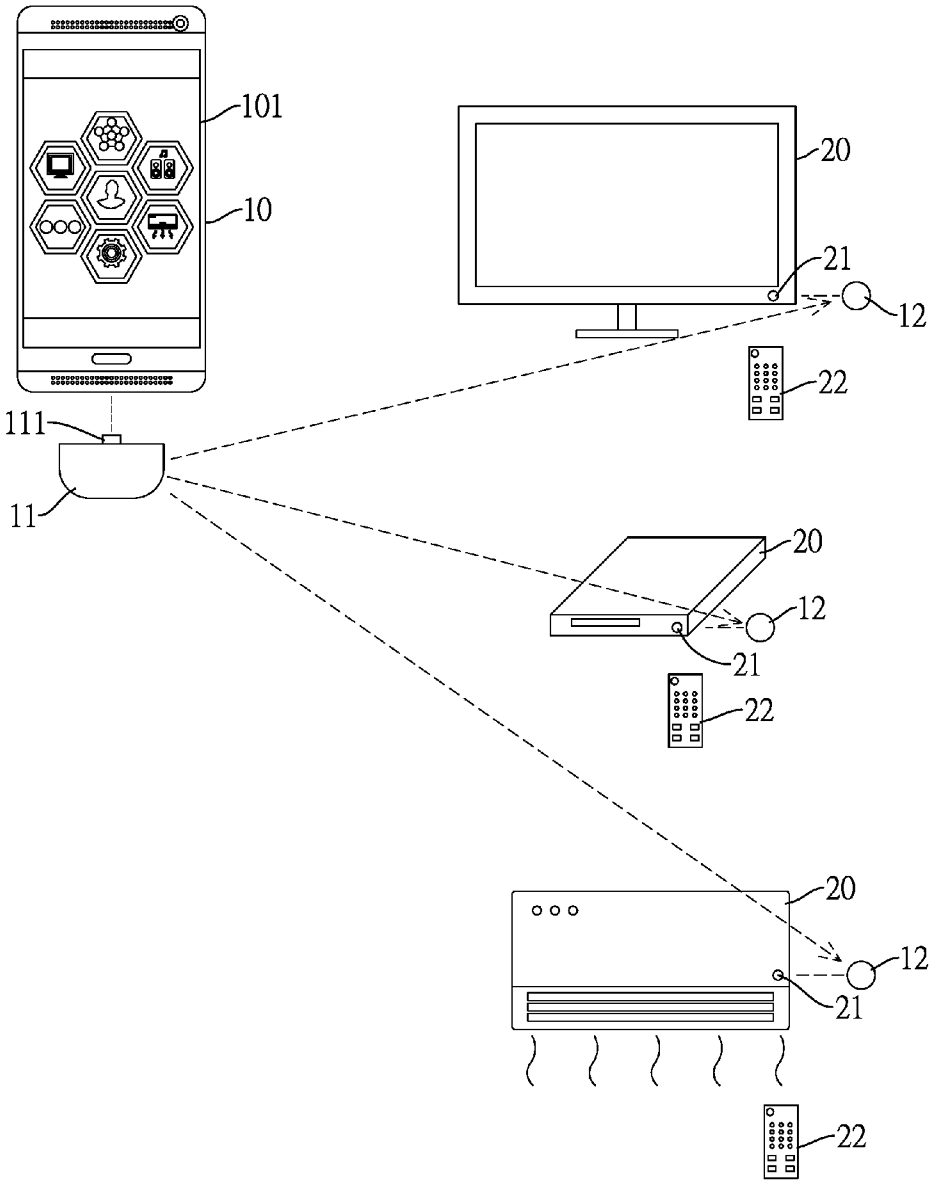
FIG. 1 is a schematic view of a system for integrating infrared remote controls of home appliances in accordance with the present invention.

With reference to FIG. 1, a system for integrating infrared remote controls of home appliances in accordance with the present invention is used to integrate the remote controls of various home appliances and controls those home appliances based on transmission of radio waves. The system for integrating infrared remote controls of home appliances includes a smart electronic device 10, a transmission device 11 and multiple conversion devices 12. The multiple conversion devices 12 are respectively mounted on multiple home appliances 20. Each home appliance 20 has an infrared appliance receiver 21 and an infrared remote control 22. The smart electronic device 10 may be a regular smart phone or a tablet PC (Personal Computer) and is installed an OS (operating system) and an application program. After the application program in the smart electronic device 10 is launched, the OS displays a user interface 101 on a screen of the smart electronic device 20. The OS may be one of Android °, iOS®, Windows® operating system. The smart electronic device 10 is connected with the transmission device 11.

Figure 2:
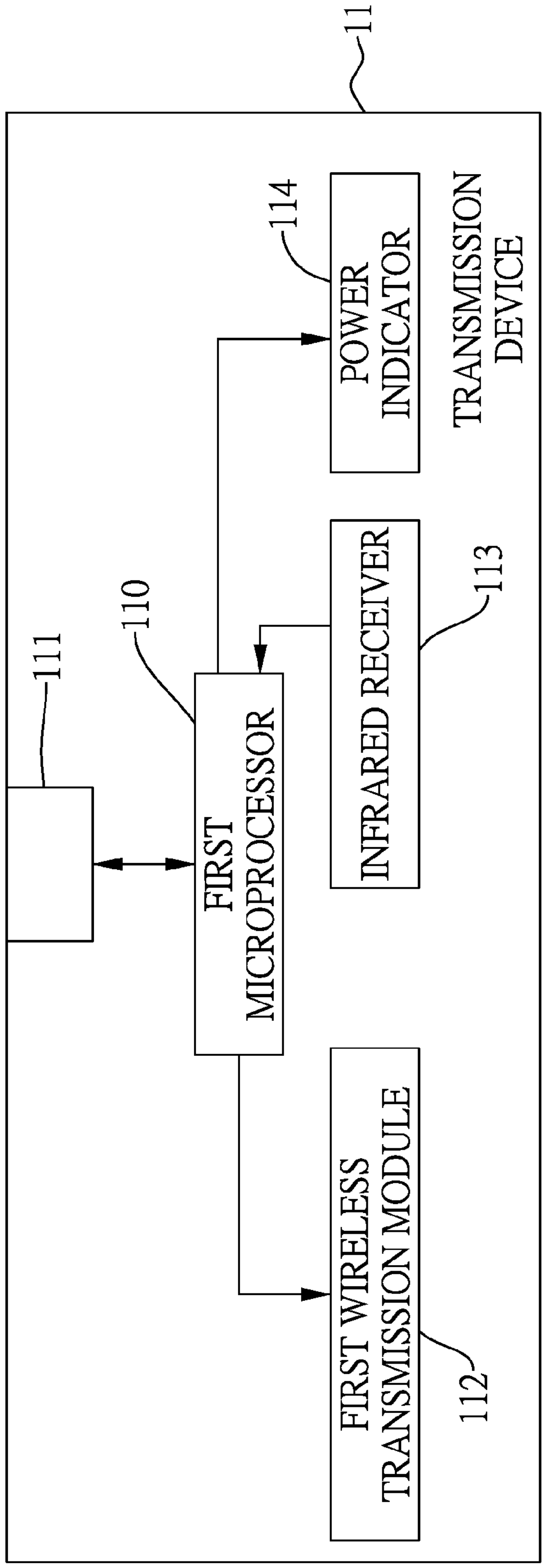
FIG. 2 is a functional block diagram of a transmission device of the system in FIG. 1.

With reference to FIG. 2, the transmission device 11 has a first microprocessor 110, a connection plug 111, a first wireless transmission module 112, an infrared receiver 113 and a power indicator 114. The first microprocessor 110 is connected to the connection plug 111, an output terminal of the microprocessor 110 is connected to an input terminal of the first wireless transmission module 112, and an output terminal of the infrared receiver 113 is connected to an input terminal of the first microprocessor 110, such that the smart electronic device 10 can transmit signals through the transmission device 11. The connection plug 111 may be a Micro USB (Universal Serial Bus) plug or another other connector and is plugged in a connection port of the smart electronic device 10, such as a USB port. When the transmission device 111 is connected with the smart electronic device 10, the power indicator 114 is lit. The smart electronic device 10 needs to support the USB OTG (On-the-go) for the transmission device 11 to change from a peripheral device to a USB host equipment. Thus, the transmission device 11 can perform self-initiated data transmission. Moreover, the USB host equipment can be selected from a setting of the smart electronic device 10 for the transmission device 11 to become a plug-and-play device for ease of use.

Figure 3:
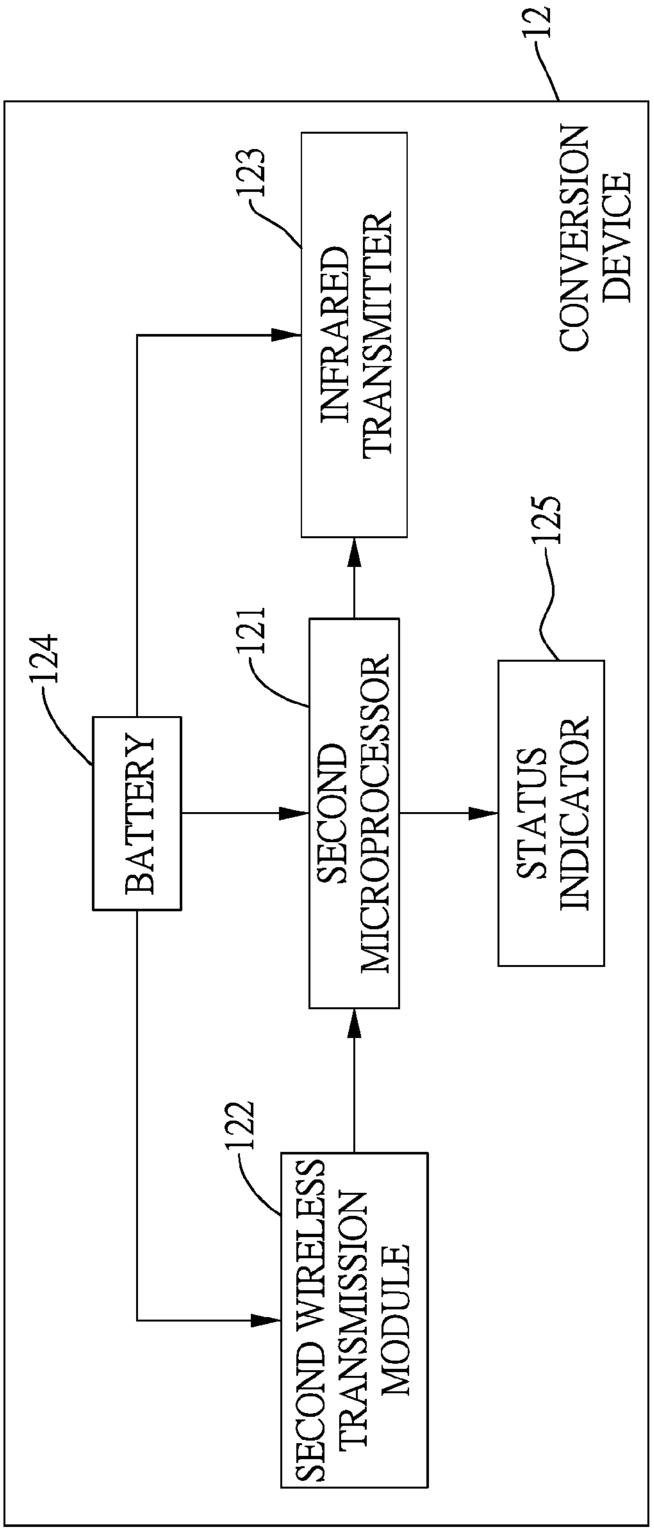
FIG. 3 is a functional block diagram of an embodiment of a conversion device of the system in FIG. 1.

The multiple conversion devices 12 can be attached to, stuck on or magnetically attracted to the multiple home appliances 20 respectively. With reference to FIG. 3, an embodiment of the multiple conversion devices 12 is shown. Each conversion device 12 has a second microprocessor 121, a second wireless transmission module 122, an infrared transmitter 123, a battery 124 and a status indicator 125. An output terminal of the second wireless transmission module 122 is connected to an input terminal of the second microprocessor 121. An output terminal of the second microprocessor 121 is connected to an input terminal of the infrared transmitter 123. An input terminal of the status indicator 125 is connected to an output terminal of the second microprocessor 121. The battery 124 is connected to the second wireless transmission module 122, the infrared transmitter 123 and the second microprocessor 121 to supply operating power thereto. Each conversion device 12 utilizes the second wireless transmission module 122 to wirelessly connect to the smart electronic device 10. The second wireless transmission module 122 and the first wireless transmission module 112 pair up with each other and communicate with each other according to a same communication protocol, such as ZigBee, Bluetooth or WiFi (Wireless Fidelity). The infrared transmitter 123 of each conversion device 12 transmits signals to the infrared appliance receiver 21 of a corresponding home appliance 20 in an obstruction-free manner. The status indicator 125 is lit up to indicate a status of the conversion device, such as “connected”, “connection successful” or “disconnected”, by means of color and blinking effect of light emitted from the status indicator 125.

Figure 4:
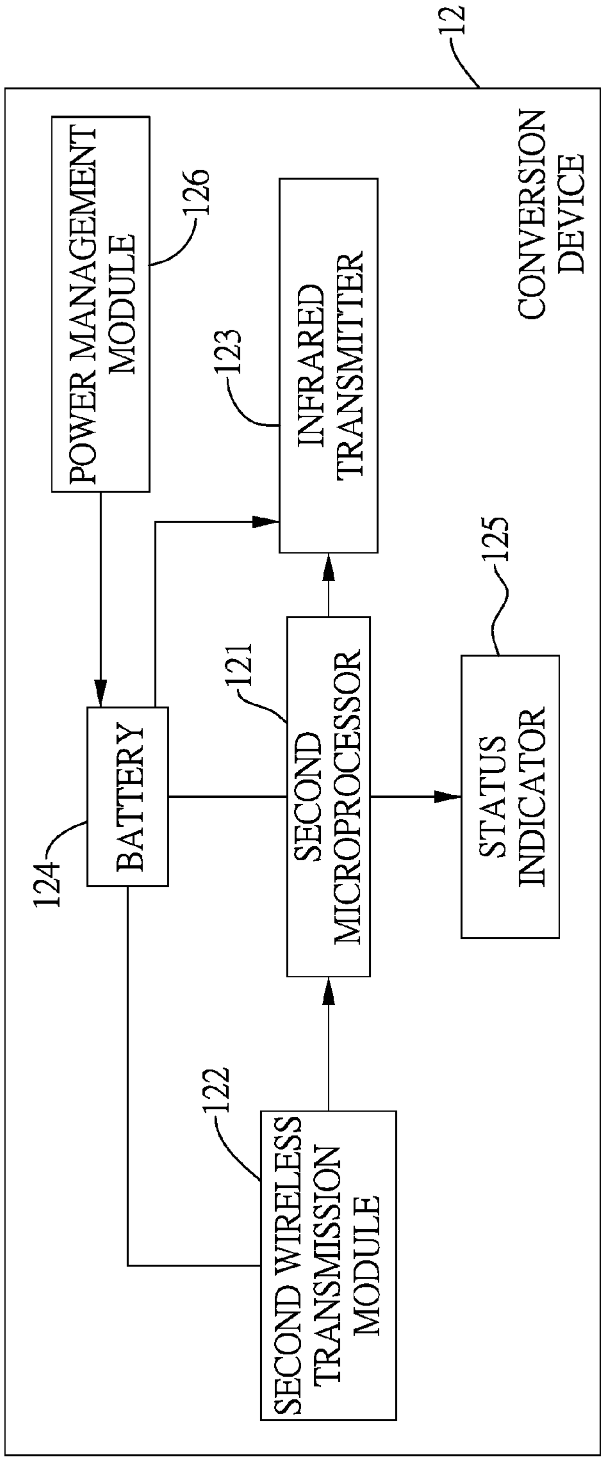
FIG. 4 is a functional block diagram of another embodiment of a conversion device of the system in FIG. 1.

With reference to FIG. 4, another embodiment of the multiple conversion devices 12 is shown. Each conversion device 12 has a power management module 126 that is electrically connected to the battery 124 and the second microprocessor 121 for management of power stored in the battery 124. In the present embodiment, when the second wireless transmission module 122 of each conversion device 12 receives no signal from the first wireless transmission module 112 in the transmission device 11 within a preset time, the power management module 126 perform power control to reduce the power supplied by the battery 124.

Thus, the conversion device 12 stays at a low-power standby mode for less power consumption.

Figure 5:
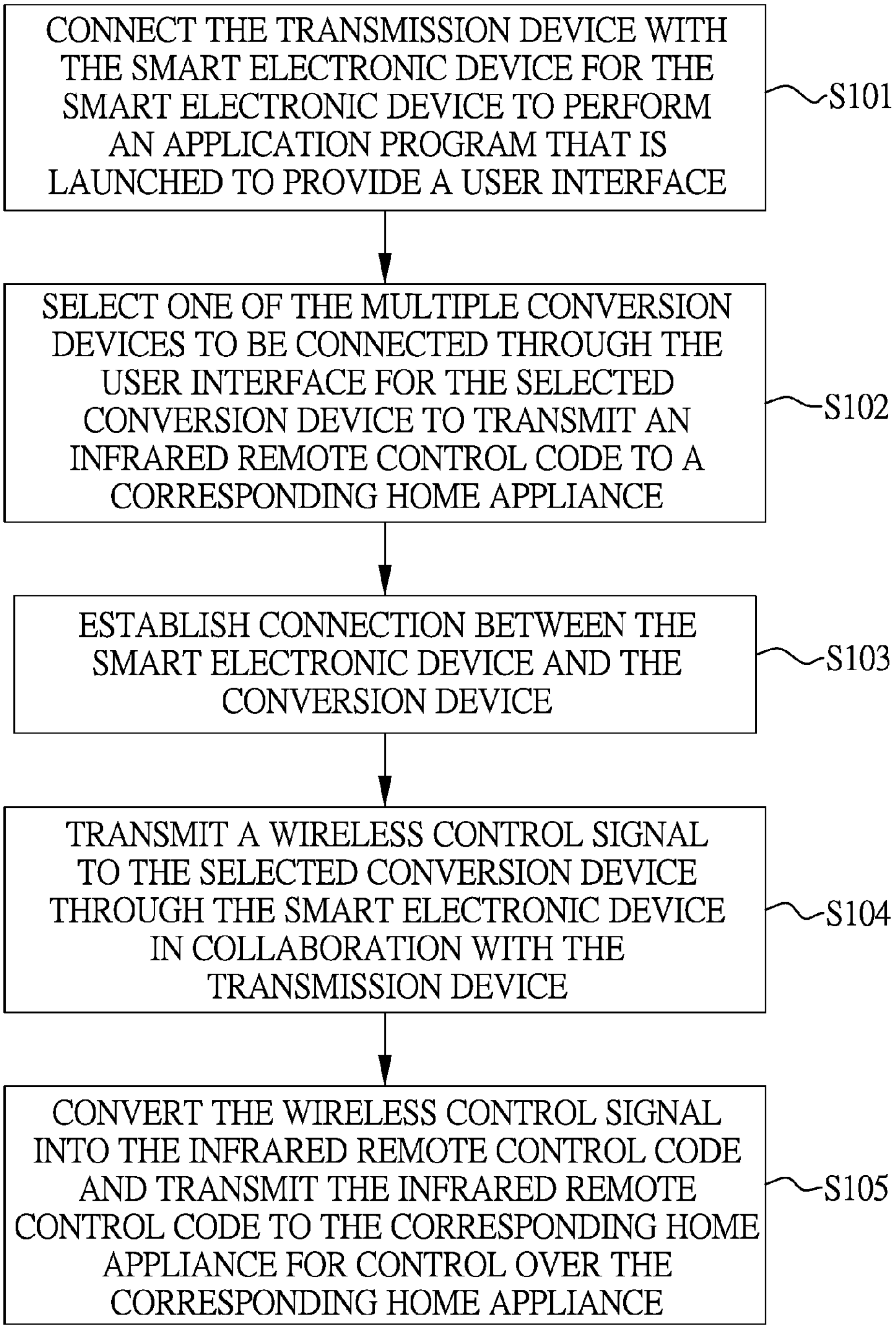
FIG. 5 is a flow diagram of a method for integrating infrared remote controls of home appliances in accordance with the present invention.

With reference to FIG. 5, a method for integrating infrared remote controls of home appliances in accordance with the present invention includes the following steps.

Step S101: Connect the transmission device 11 with the smart electronic device 10. The smart electronic device 10 performs the application program. The application program is launched to provide the user interface 101.

Step S102: Select one of the multiple conversion devices 12 to be connected through the user interface 101. The selected conversion device 12 transmits an infrared remote control code to a corresponding home appliance 20.

Step S103: Establish connection between the smart electronic device 10 and the conversion device 12.

Step S104: Transmit a wireless control signal to the selected conversion device 12 through the smart electronic device in collaboration with the transmission device 11. The wireless control signal is a radio signal.

Step S105: Convert the wireless control signal into the infrared remote control code and transmit the infrared remote control code to the corresponding home appliance 20 for control over the corresponding home appliance 20.

In step S101 the application program can be downloaded to the smart electronic device 10 from a specific website (or from scanning of QR code for connection to the specific website) or from an on-line APP (Application) store built in the OS for execution of the application program. After the application program is launched, the smart electronic device 10 is connected with the transmission device 11. Supposing that the transmission device 11 fails to be connected to the smart electronic device 10, the user interface 101 provided by the application program displays a status that the transmission device 11 is not connected. Under the circumstance, there is no way that functions of the remote control can be operated through execution of the application program. The connection plug 111 of the transmission device 11 is plugged in the connection port of the smart electronic device 10. It is the connection plug 111 and the connection port that are respectively employed by the transmission device 11 and the smart electronic device 10. After the transmission device 11 is connected with the smart electronic device 10, the user interface 101 displays a status that the transmission device 11 is connected, such that the smart electronic device 10 can be collaborated with the transmission device 11 to launch the application program so as to provide an integrated remote control for the multiple home appliances and thus replace the multiple infrared remote controls 22 of the multiple home appliances 20.

Figure 6A:
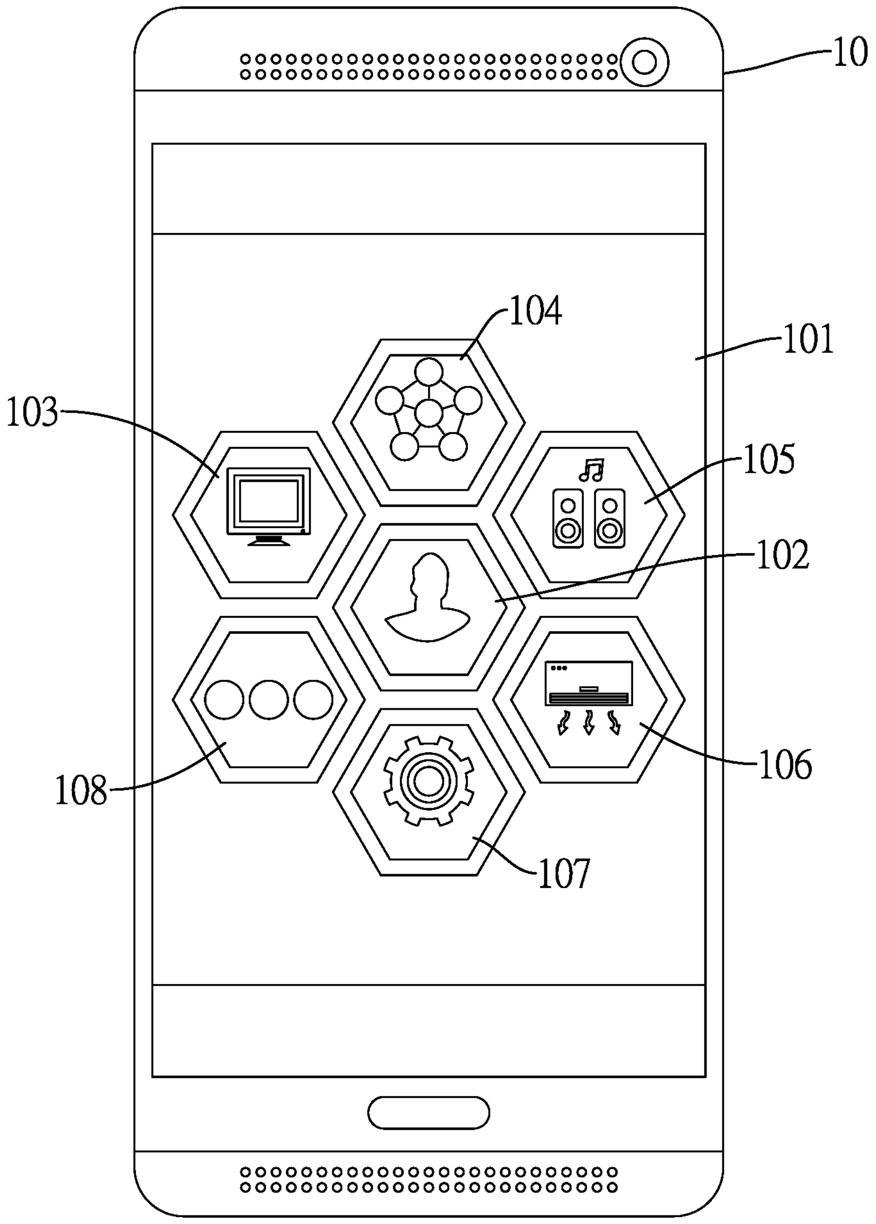
FIGS. 6A and 6B are schematic views showing a user interface of a smart electronic device of the system in FIG. 1.

With reference to FIG. 6A, after the smart electronic device 10 launches the application program, the user interface 101 is displayed on a screen of the smart electronic device. The user interface 101 has multiple options including but not limited to a user option 102, an image option 103, a situational option 104, a music option 105, an air-conditioning option 106, a configuration option 107, and another option 108 for users' selection. In step S102 one of the multiple options is chosen for selection of one of the multiple conversion devices to be connected. The selected conversion device 12 is mounted on a corresponding home appliance 20 in a way that the infrared transmitter of the selected conversion device 12 is directed to the infrared appliance receiver 21 of the corresponding home appliance 20 for transmission of the infrared remote control code.

Figure 6B:
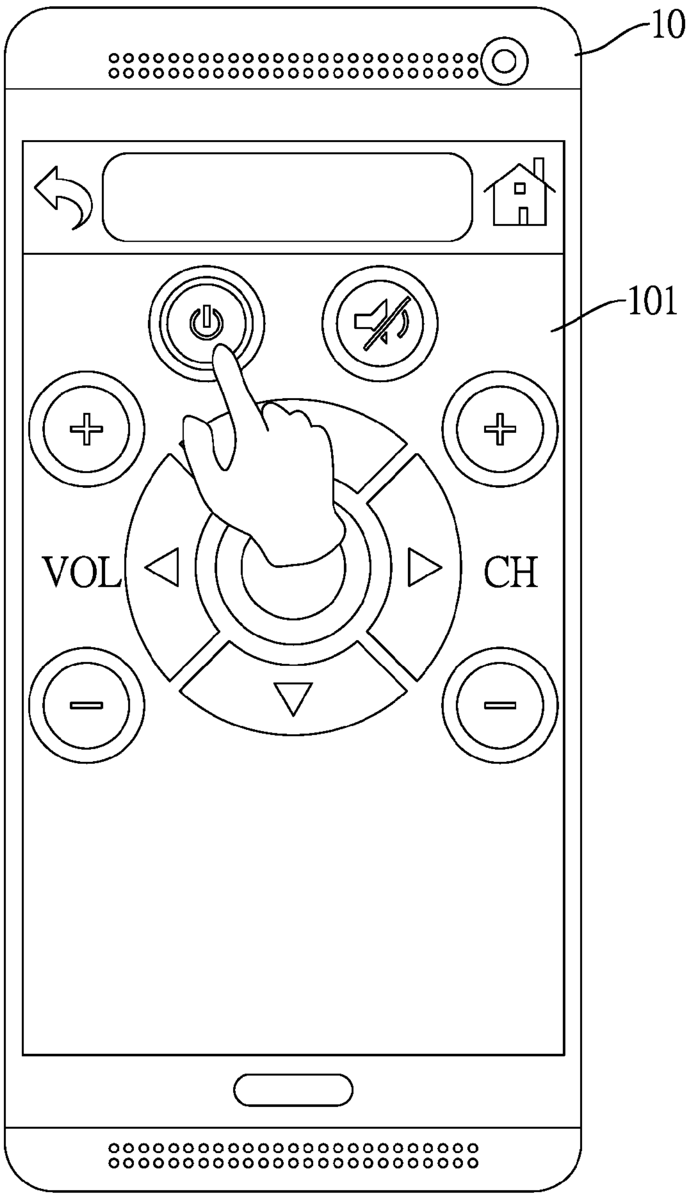

In step S103 after selection of one of the multiple conversion device 12, with reference to FIG. 6B, the user interface 101 further displays multiple buttons thereon similar to those buttons of the infrared remote control 22 for the corresponding home appliance 20 to establish connection between the smart electronic device 10 and the selected conversion device 12.

Figure 7A:
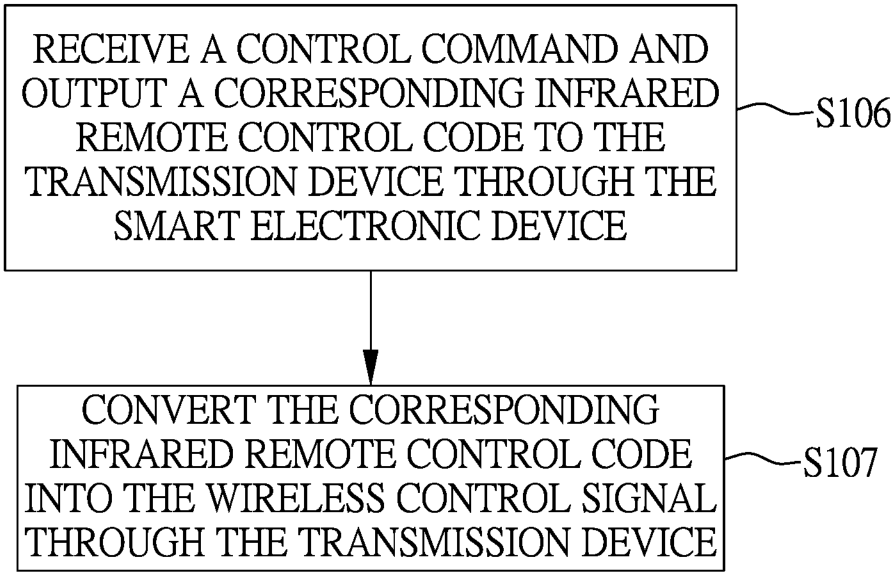
FIG. 7A is a flow diagram of additional steps of the method in FIG. 5.

With reference to FIG. 7A, step S104 further includes the following steps.

Step S106: Receive a control command and output a corresponding infrared remote control code to the transmission device 11 through the smart electronic device.

Step S107: Convert the corresponding infrared remote control code into the wireless control signal through the transmission device 11.

With further reference to FIG. 6B, one of the multiple buttons on the user interface 101 is selected to input the control command. In step S106 the smart electronic device receives the control command and output the corresponding infrared remote control code to the transmission device 11. In step S107 the first microprocessor 110 of the transmission device 11 converts the corresponding infrared remote control code into the wireless control signal. In step S105 the second microprocessor 121 of the selected conversion device 12 converts the wireless control signal back to the corresponding infrared remote control code, and the infrared transmitter 123 transmits the corresponding infrared remote control code to the infrared receiver 21 of the corresponding home appliance 20 so as to provide remote control over the corresponding home appliance 20.

Figure 7B:
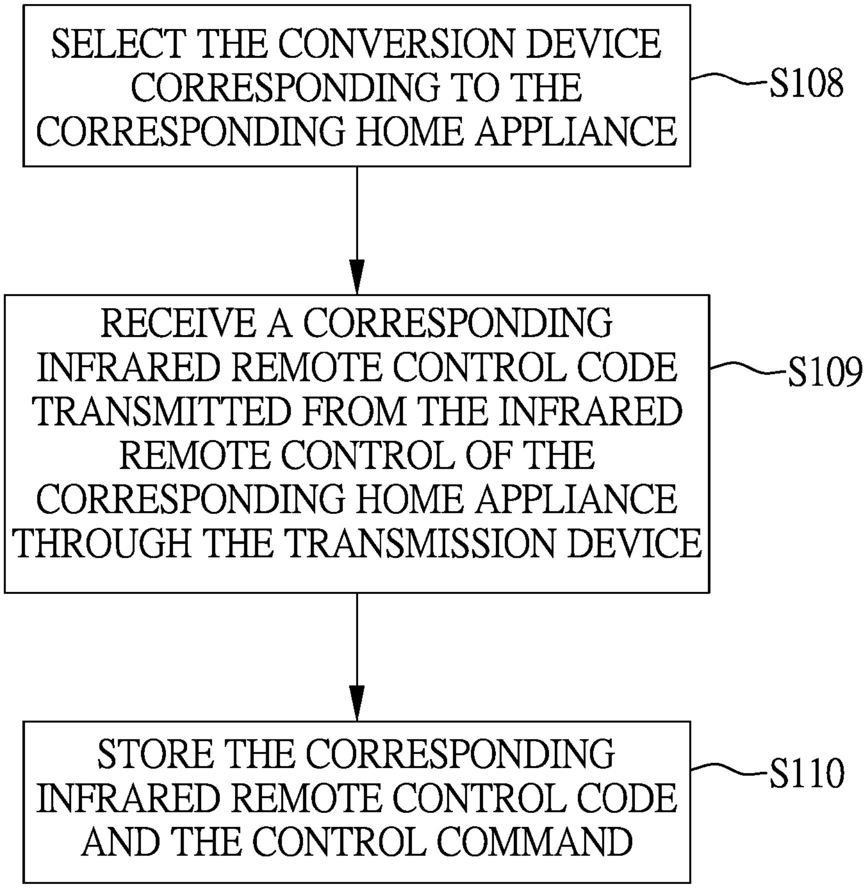
FIG. 7B is a flow diagram of a learning mode of the method in FIG. 5.

With reference to FIG. 7B, the smart electronic device has a learning mode for storage of the corresponding infrared remote control code. The learning mode is performed by the smart electronic device 10 and includes the following steps.

Step S108: Select the conversion device 12 corresponding to the corresponding home appliance 20.

Step S109: Receive a corresponding infrared remote control code transmitted from the infrared remote control 22 of the corresponding home appliance 20 through the transmission device 11.

Step S110: Store the corresponding infrared remote control code and the control command.

Figure 8A:
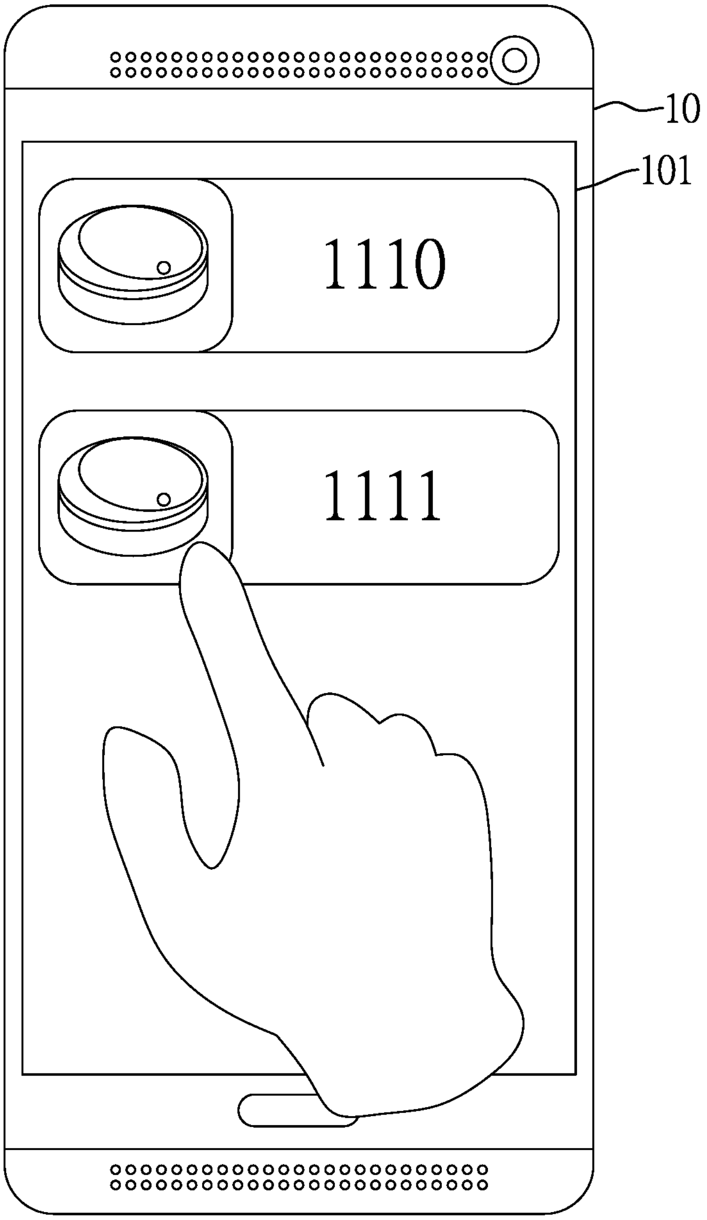
FIGS. 8A to 8E are schematic views showing the user interface of the smart electronic device in FIGS. 6A and 6B upon the learning mode.
Figure 8B:
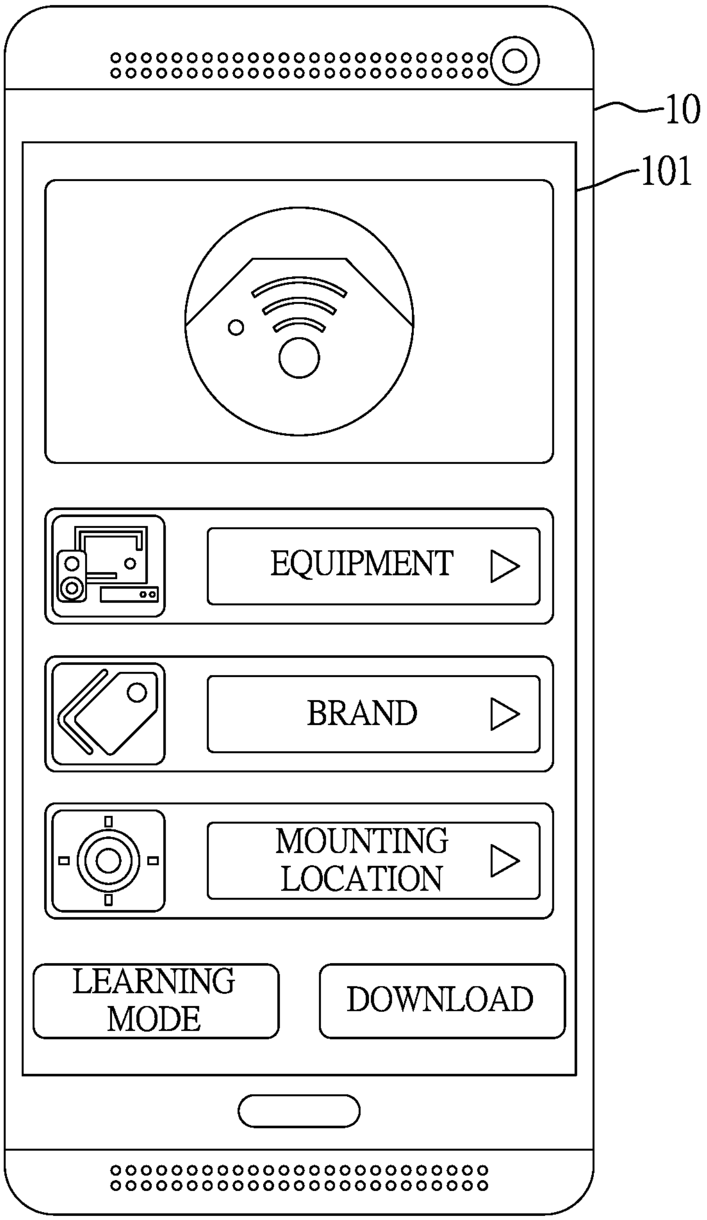

As to how to pick the configuration option 107 on the user interface 101 in search of one of the multiple conversion devices 12, with reference to FIG. 8A, the user interface displays the conversion devices currently identified and multiple device numbers corresponding to the identified conversion devices for users to select one of the multiple device numbers indicative of a corresponding conversion device to be selected. The status indicator 125 of the selected conversion device 12 emits flashing red light for users to confirm if the conversion device 12 with the status indicator 125 flashing red light is the conversion device 12 to be connected. In step S108 If the conversion device flashing red light is the target to be connected, users can input the device number in association with the conversion device flashing red light via the user interface 101. After the device number is inputted, in the event of successful connection, the status indicator 125 of the connected conversion device 12 flashes green light indicative of successful connection of the connected conversion device 12. With reference to FIG. 8B, users can configure model number, brand and mounting location of the home appliance 20 corresponding to the conversion device 12 to be connected. The configured model number, brand and mounting location of the home appliance 20 can determine a link distance between the conversion device 12 and to be connected for an infrared protocol applied to the conversion device 12 to be connected and a corresponding home appliance 20. After the configuration is done, users can press a learning mode button on the user interface 101.

Figure 8C:
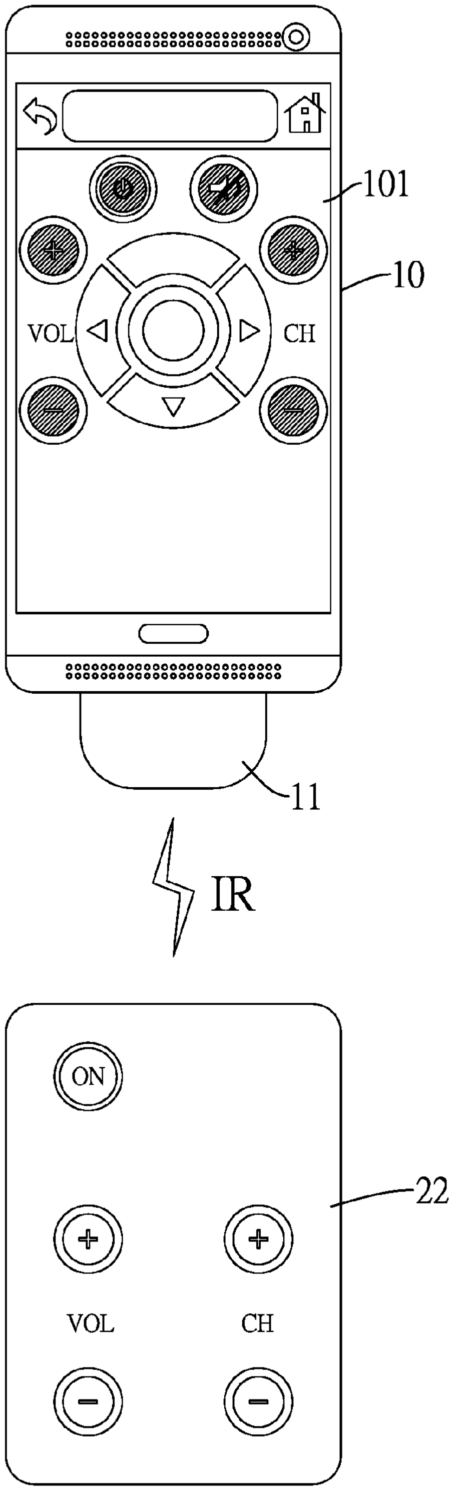
Figure 8D:
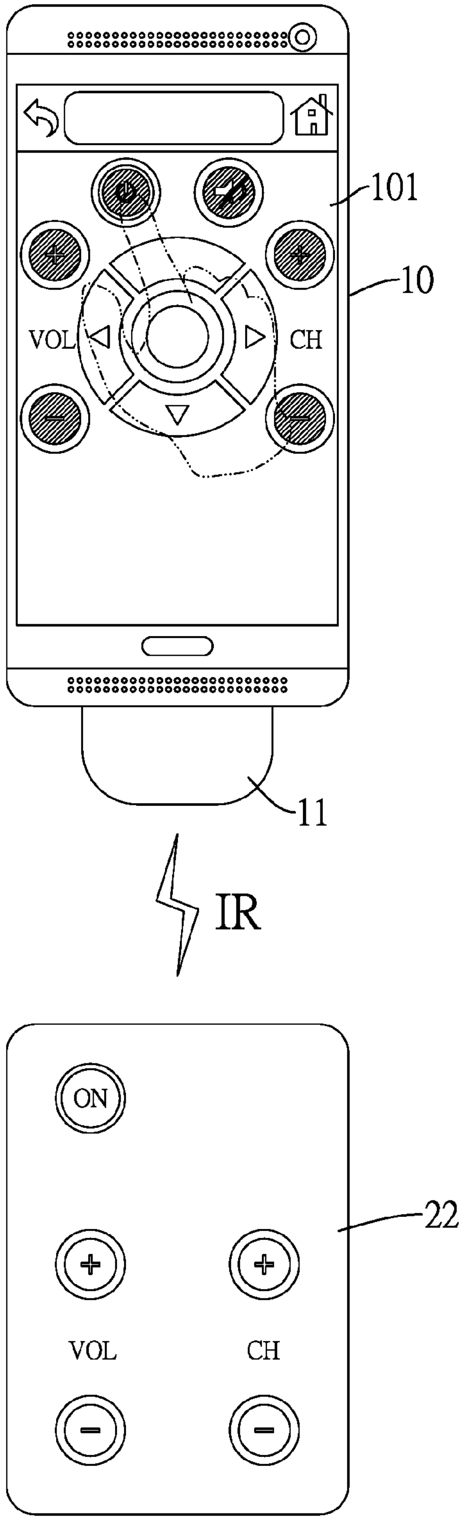
Figure 8E:
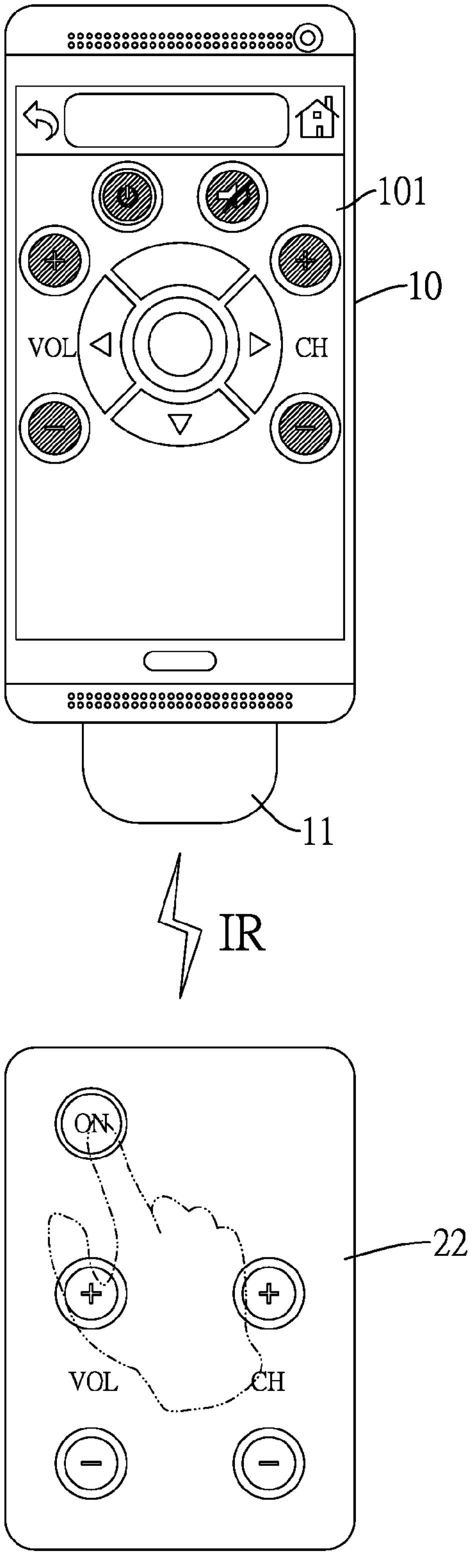

With reference to FIG. 8C, the user interface 101 displays the multiple buttons simulating the multiple buttons of the infrared remote control 22 corresponding to the selected conversion device 12. The simulated buttons are initially displayed in a dark color. The transmitter end of the infrared remote control 22 is directed to the infrared receiver 113 of the transmission device 11 for transmission of a corresponding infrared remote control code. Preferably, the infrared remote control 22 and the transmission device 11 are separated by 10 cm. With reference to FIGS. 8D and 8E, in step S109 one of the multiple buttons on the user interface 101 is selected to confirm a control command intended for selection of the button, and one of the buttons shown on the infrared remote control 22 is pressed for the smart electronic device 10 to receive the infrared remote control code associated with the selected button on the infrared remote control 22 through the infrared receiver 113 of the transmission device 11. Control commands for the buttons on the user interface 101 and on the infrared remote control 22 are identical.

In Step 110 the smart electronic device 10 stores the infrared remote control code and the corresponding control command. With further reference to FIG. 6B, after the storage, color of the buttons on the user interface 101 changes from the dark color to a bright color, such as white or other color. Step S108 to step S110 are repeated to complete storage of the infrared remote control codes associated with all the buttons on each infrared remote control and the buttons displayed on the user interface 101. After completion of the storage, the learning mode is finished and the buttons of the infrared remote controls 22 and the infrared remote control codes corresponding to the buttons are stored in the smart electronic device 10.

The learning mode can be implemented in a different way. With reference to FIG. 8B, after the model and brand of the multiple home appliances 20 are configured, a "DOWNLOAD" button on the user interface 101 can be pressed to download the infrared remote control codes of the infrared remote controls 22 of corresponding home appliances 20. The smart electronic device 10 is connected to a cloud server through a network. The cloud server includes a database containing multiple infrared remote control codes corresponding to multiple home appliances with different model and brand. Given the configured model and brand of the multiple home appliances, the infrared remote control codes corresponding to the multiple home appliances can be downloaded from the cloud server and the control commands corresponding to the infrared remote control codes are stored in the smart electronic device 10 to simplify the storage of the infrared remote control codes and the control commands and the simplicity increases operational convenience.

After the learning mode is done, upon selection of each conversion device 12, the user interface 101 displays multiple buttons corresponding to the buttons on the infrared remote control 22 of a corresponding home appliance 20 as shown in FIG. 6B.

The learning mode can be repeated for the smart electronic device 10 to respectively connect to the multiple conversion devices 12 and store the infrared remote control codes associated with the infrared remote controls 22 of the multiple home appliances 20. The multiple conversion devices are respectively fixed on the multiple home appliances 20, such that the smart electronic device 10 can be collaborated with the transmission device 11 at act as an integrated remote control for the multiple home appliances 20.

With further reference to FIG. 6A, after the configuration of the multiple home appliances 20 is done, the multiple home appliances 20 are categorized according to types of the multiple home appliances 20 and the infrared remote control codes for controlling the respective types of home appliances 20 are stored under the image option 103, the music option 105, the air-conditioning option 106 and the other option 108, such that the image option 103, the music option 105, the air-conditioning option 106 and the other option 108 on the user interface 101 can be selected to choose one home appliance to be controlled at a time. Besides, the user option 102 on the user interface 101 can be used to switch to a different user for different users to customize their preferred configuration.

The situational option on the user interface 101 is selected for the smart electronic device 10 in collaboration with the transmission device 11 to transmit multiple wireless control signals to corresponding conversion devices 12 and for the corresponding conversion devices 12 to transmit the infrared remote control codes to corresponding home appliances 20. For example, selection of a movie situation can simultaneously power on a CD (Compact Disc) player and a television and switch video output from the television to the CD player.

In sum, the present invention allows the smart electronic device collaborated with the transmission device to perform the application program and act as an integrated remote control substantially replacing the infrared remote controls of the multiple home appliances to simplify remote control equipment of home appliances and provide accurate and fast remote control over home appliances. Additionally, radio communication is adopted between the transmission device and the multiple conversion devices. As radio communication is omnidirectional and can penetrate obstruction, the issues of unsmooth control due to obstruction or long distance between home appliances and their respective infrared remote controls can be avoided accordingly.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system for integrating infrared remote controls of home appliances, comprising:

a smart electronic device having an operating system to perform an application program, wherein the application program displays an user interface and stores multiple infrared remote control codes for respectively controlling multiple home appliances, wherein each infrared remote control code corresponds to a control command inputted from the user interface and the smart electronic device outputs a corresponding infrared remote control code;

a transmission device connected to the smart electronic device and having:

an infrared receiver connected to the first microprocessor and receiving the corresponding infrared remote control code;

a first microprocessor serving to convert the corresponding infrared remote control code into a wireless control signal; and a first wireless transmission module connected to the first microprocessor and transmitting the wireless control signal; and multiple conversion devices mounted on the respective home appliances, each conversion device having:

a second wireless transmission module wirelessly connected to the first wireless transmission module and receiving the wireless control signal;

a second microprocessor connected to the second wireless transmission module and converting the wireless control signal into the corresponding infrared remote control code; and an infrared transmitter connected to the second microprocessor and transmitting the corresponding infrared remote control code to a corresponding home appliance.

2. The system as claimed in claim 1, wherein multiple options corresponding to the respective conversion devices are displayed on the user interface, one of the multiple options is selected for a corresponding conversion device to control a corresponding home appliance.

3. The system as claimed in claim 1, wherein each home appliance is equipped with an infrared remote control having multiple buttons, the infrared receiver of the transmission device serves to receive the infrared remote control code generated when each button of the infrared remote control is selected and transmit the infrared remote control code to the smart electronic device.

4. The system as claimed in claim 1, wherein the smart electronic device has a connection port, and the transmission device has a connection plug plugged in the connection port for the transmission device and the smart electronic device to be electrically connected.

5. The system as claimed in claim 1, wherein the wireless control signal is a radio signal, and the first wireless transmission module and the second wireless transmission module communicate with each other according to one of a ZigBee® protocol, a Bluetooth® protocol and a WiFi® (Wireless Fidelity) protocol.

6. The system as claimed in claim 1, wherein each conversion device has:

a battery connected to the second microprocessor, the second wireless transmission module, and the infrared transmitter; and a power management module connected to the battery.

7. The system as claimed in claim 2, wherein each conversion device has a device number displayed on the user interface for selection of the conversion device.

8. The system as claimed in claim 2, wherein the smart electronic device transmits the multiple wireless control signals to the respective conversion devices through the transmission device for the respective conversion devices to transmit corresponding infrared remote control codes to corresponding home appliances.

9. The system as claimed in claim 2, wherein the smart electronic device has a connection port, and the transmission device has a connection plug plugged in the connection port for the transmission device and the smart electronic device to be electrically connected.

10. The system as claimed in claim 2, wherein the wireless control signal is a radio signal, and the first wireless transmission module and the second wireless transmission module communicate with each other according to one of a ZigBee® protocol, a Bluetooth® protocol and a WiFi® protocol.

11. The system as claimed in claim 2, wherein each conversion device has:

a battery connected to the second microprocessor, the second wireless transmission module, and the infrared transmitter; and a power management module connected to the battery.

12. The system as claimed in claim 3, wherein the smart electronic device has a connection port, and the transmission device has a connection plug plugged in the connection port for the transmission device and the smart electronic device to be electrically connected.

13. The system as claimed in claim 3, wherein the wireless control signal is a radio signal, and the first wireless transmission module and the second wireless transmission module communicate with each other according to one of a ZigBee® protocol, a Bluetooth® protocol and a WiFi® protocol.

14. The system as claimed in claim 3, wherein each conversion device has:

a battery connected to the second microprocessor, the second wireless transmission module, and the infrared transmitter; and a power management module connected to the battery.

15. The system as claimed in claim 7, wherein the smart electronic device has a connection port, and the transmission device has a connection plug plugged in the connection port for the transmission device and the smart electronic device to be electrically connected.

16. The system as claimed in claim 7, wherein the wireless control signal is a radio signal, and the first wireless transmission module and the second wireless transmission module communicate with each other according to one of a ZigBee® protocol, a Bluetooth® protocol and a WiFi® protocol.

17. The system as claimed in claim 7, wherein each conversion device has:

a battery connected to the second microprocessor, the second wireless transmission module, and the infrared transmitter; and a power management module connected to the battery.

18. The system as claimed in claim 8, wherein the smart electronic device has a connection port, and the transmission device has a connection plug plugged in the connection port for the transmission device and the smart electronic device to be electrically connected.

19. The system as claimed in claim 8, wherein the wireless control signal is a radio signal, and the first wireless transmission module and the second wireless transmission module communicate with each other according to one of a ZigBee® protocol, a Bluetooth® protocol and a WiFi® protocol.

20. The system as claimed in claim 8, wherein each conversion device has:

a battery connected to the second microprocessor, the second wireless transmission module, and the infrared transmitter; and a power management module connected to the battery.

21. A method for integrating infrared remote controls of home appliances performed by a system for integrating infrared remote controls of home appliances, wherein the system has a smart electronic device, a transmission device and multiple conversion devices, the method comprising steps of:

connecting the transmission device with the smart electronic device for the smart electronic device to perform an application program, wherein the application program is launched to provide a user interface;

selecting one of the multiple conversion devices to be connected through the user interface, wherein the selected conversion device transmits an infrared remote control code to a corresponding home appliance;

establishing connection between the smart electronic device and the conversion device;

transmitting a wireless control signal to the selected conversion device through the smart electronic device in collaboration with the transmission device; and converting the wireless control signal into the infrared remote control code and transmitting the infrared remote control code to the corresponding home appliance for control over the corresponding home appliance.

22. The method as claimed in claim 21, wherein the step of transmitting a wireless control signal to the selected conversion device through the smart electronic device in collaboration with the transmission device has steps of:

receiving a control command and outputting a corresponding infrared remote control code to the transmission device through the smart electronic device; and converting the corresponding infrared remote control code into the wireless control signal through the transmission device.

23. The method as claimed in claim 21, wherein the wireless control signal is a radio signal.

24. The method as claimed in claim 22, wherein the smart electronic device has a learning mode for storage of the corresponding infrared remote control code, and the learning mode is performed by the smart electronic device and has steps of"

selecting the conversion device corresponding to the selected home appliance;

receive the corresponding infrared remote control code transmitted from the infrared remote control of the corresponding home appliance through the transmission device; and storing the corresponding infrared remote control code and the control command.

25. The method as claimed in claim 22, wherein the wireless control signal is a radio signal.

26. The method as claimed in claim 24, wherein the wireless control signal is a radio signal.

* * * * *